United States Patent
Heo

(10) Patent No.: US 7,171,236 B2
(45) Date of Patent: Jan. 30, 2007

(54) CALL SERVICE METHOD FOR A CELLULAR PHONE

(75) Inventor: Yun-Do Heo, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 596 days.

(21) Appl. No.: 10/161,153

(22) Filed: Jun. 3, 2002

(65) Prior Publication Data

US 2002/0183091 A1 Dec. 5, 2002

(30) Foreign Application Priority Data

Jun. 4, 2001 (KR) .............................. 2001-31094

(51) Int. Cl.
*H04M 1/00* (2006.01)
*H04B 1/38* (2006.01)

(52) U.S. Cl. .................................. 455/556.2; 455/564

(58) Field of Classification Search ............. 455/556.2, 455/551, 564; 715/763, 864
See application file for complete search history.

(56) References Cited

U.S. PATENT DOCUMENTS 5,845,282 A * 12/1998 Alley et al. ................... 707/10
6,332,024 B1 * 12/2001 Inoue et al. ............ 379/433.06
6,516,202 B1 * 2/2003 Hawkins et al. .......... 455/556.2
6,601,076 B1 * 7/2003 McCaw et al. ............. 707/203
6,636,203 B1 * 10/2003 Wong et al. ................ 345/173
6,771,980 B2 * 8/2004 Moon ....................... 455/556.2
6,778,647 B1 * 8/2004 Dumas ..................... 379/93.12
6,826,614 B1 * 11/2004 Hanmann et al. ........... 709/227
2001/0002926 A1 * 6/2001 Moon ....................... 379/93.17
2003/0013483 A1 * 1/2003 Ausems et al. ............. 455/556
2003/0100347 A1 * 5/2003 Okada et al. ............... 455/567

* cited by examiner

*Primary Examiner*—Sonny Trinh
*Assistant Examiner*—Marivelisse Santiago-Cordero
(74) *Attorney, Agent, or Firm*—Dilworth & Barrese, LLP

(57) ABSTRACT

A call service method includes the steps of determining if the electronic phone book database is being used upon occurrence of a call event, searching the electronic phone book database for individual information using a phone number associated with the call event if the electronic phone book database is not being used, displaying a searched individual information and the number associated with the call event and proceeding to the call, displaying the phone number associated with the call event if the electronic phone book database is being used, and proceeding to the call.

4 Claims, 7 Drawing Sheets

CALL SERVICE METHOD FOR A CELLULAR PHONE

PRIORITY

This application claims priority to an application entitled "Call Service Method of Cellular Phone", filed in the Korean Industrial Property Office on Jun. 4, 2001 and assigned Serial No. 2001-31094, the contents of which are hereby incorporated by reference.

BACKGROUND OF THE INVENTION

1. Field of the Invention

The present invention relates to a cellular phone, and more particularly to a call service method for a cellular phone having an electronic phone book database.

2. Description of the Related Art

Developments in communications technology and diversity of users' needs nowadays force a cellular phone not only to function as a mere call service device but also as a management device of individuals' information such as names, addresses, phone numbers and so forth. This type of information is stored at the memory of the cellular phone as an electronic phone book in the form of a database. The electronic phone book may store a plurality of names and at least one phone number associated with each name.

A user can change or delete telephone numbers in the electronic phone book or add another phone number by manipulating buttons on the cellular phone. Alternatively, the user can use a computer to edit the electronic phone book stored in the cellular phone, when the cellular phone supports data synchronization with the computer. The data synchronization is a technique of a shared management of information of both the personal computer and personal digital assistant phone by both ends, and makes it possible for the user to store important information in the computer for security reasons and update it quickly and easily. The cellular phone can further connect to another cellular phone via infrared communications so as to edit its electronic phone book.

The electronic phone book is used not only for quick referencing of a desired phone number and enabling an easy dialing, but also for immediate identification of a counterpart, from its phone number. When an outgoing or incoming call event occurs, the cellular phone searches its electronic phone book for a phone number of a called or calling party and then displays a stored name associated with the phone number.

A conventional cellular phone cannot perform such a phone application during an outgoing or incoming call event when its electronic phone book is being used for another propose (i.e., adding/correcting/deleting of individual information). This is because the cellular phone cannot search its electronic phone book for a calling or called number while it is being used for another purpose. As a result, the conventional cellular phone suffers from an inconvenience that the user has to cancel or terminate editing of the electronic phone book or the data synchronization under way in order to advance call processing.

SUMMARY OF THE INVENTION

Therefore, the present invention has been made in view of the above problems, and it is an object of the present invention to provide a method for performing a call service while an electronic phone book database is being used for another purpose.

It is another object of the present invention to provide a method for determining if an electronic phone book database is being used for another purpose upon occurrence of a call event, and if it is, then to perform a call service without searching the electronic phone book database.

It is yet another object of the present invention to provide a method for performing a call service during data synchronization.

In accordance with one embodiment of the present invention, the above and other objects can be accomplished by utilizing a call service method for a cellular phone with an electronic phone book database, comprising the steps of determining whether the electronic phone book database is being used upon occurrence of a call event; searching the electronic phone book database for an individual's information using a phone number associated with the call event when it is determined that the electronic phone book database is not being used, displaying the searched individual information and the number associated with the call event, and advancing a call processing; and displaying the phone number associated with the call event when it is determined that the electronic phone book database is being used, and advancing the call processing.

In accordance with another embodiment of the present invention, the above and other objects can be accomplished by utilizing a call service method for a cellular phone coupled with a personal digital assistant with a touch pad type keypad screen, comprising the steps of displaying a data synchronization picture with a call indicating icon upon detecting a connection of the cellular phone to a host computer; displaying a keypad screen in the form of a popup window over the data synchronization picture when the call indicating icon on the data synchronization picture is selected; and performing a call service through the keypad screen.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE PREFERRED EMBODIMENTS

The operations of preferred embodiments of the present invention will be described in detail with reference to the annexed drawings. In the following description, a detailed description of known functions and configurations incorporated herein will be omitted when it may obscure the subject matter of the present invention in unnecessary detail. In the following description, specific terms are defined in consideration of their functions for the present invention, these may vary according to users' intentions, conventional usage or the like. Definitions for these terms, therefore, should be made by the contents of the present specification.

The present invention can be adapted to a variety of cellular phones having electronic phone book databases, which can be edited and used for a call service.

Figure 1:
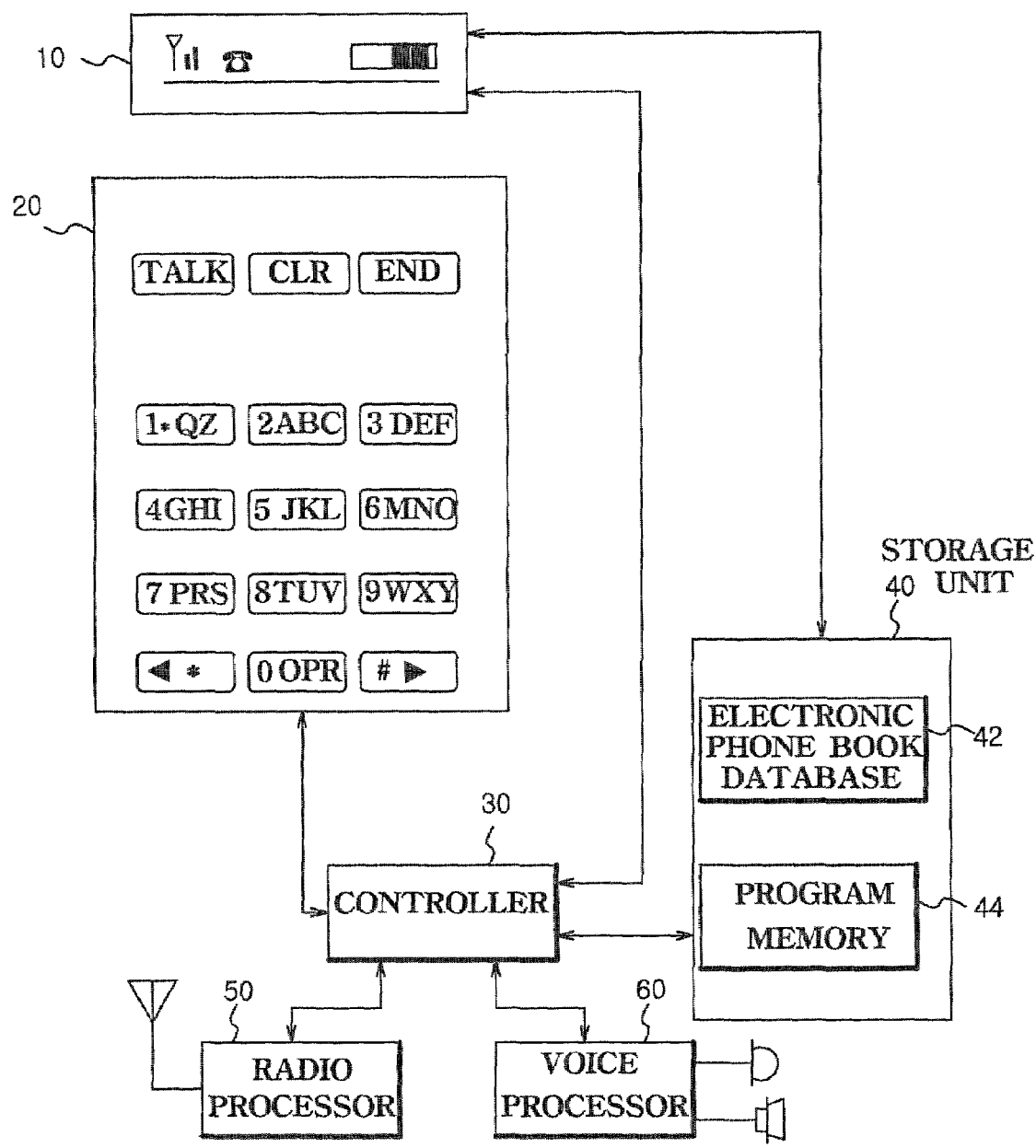
FIG. 1 is a block diagram illustrating an internal circuit construction of a cellular phone to which the present invention is applied.

FIG. 1 is a block diagram illustrating an internal construction of a cellular phone to which the present invention is applied. Referring to FIG. 1, the cellular phone comprises a display 10, a keypad 20, a controller 30, a storage unit 40, a radio processor 50 and a voice processor 60. The display 10, which may include a liquid crystal display (LCD) or the like, displays a variety of data, a limited number of characters, a plurality of moving and still images and so forth. The keypad 20 includes a plurality of character/numeric keys (1,2,3,4,5,6,7,8,9,*,0,#), function keys and a call key, with which a user can choose a desired function, enter data or select numbers. The radio processor 50 is adapted to exchange messages via a wireless interface with a mobile telecommunications system having a base station, mobile switching center and Internet interworking center. To this end, the radio processor 50 includes a modulator, demodulator, transmission amplifier and reception amplifier. The voice processor 60 is adapted to process signals to a speaker and signals from a microphone so that a user can conduct voice communication using the speaker and microphone.

The storage unit 40 includes a program memory 44 for storing a plurality of program codes and data, and an electronic phone book database 42 for storing an electronic phone book. The program memory 44 stores a variety of program codes, which function to perform a call service application in accordance with the present invention.

The controller 30 is adapted to control the radio processor 50 so that the user may conduct voice communication with a counterpart through the voice processor 60. To this end, the controller 30 includes a digital signal processor (DSP), a microprocessor and other circuits. The controller 30 is further adapted to access a variety of programs, which have to gain access to the electronic phone book database 42 from the program memory 44 and then execute the accessed programs.

Figure 2:
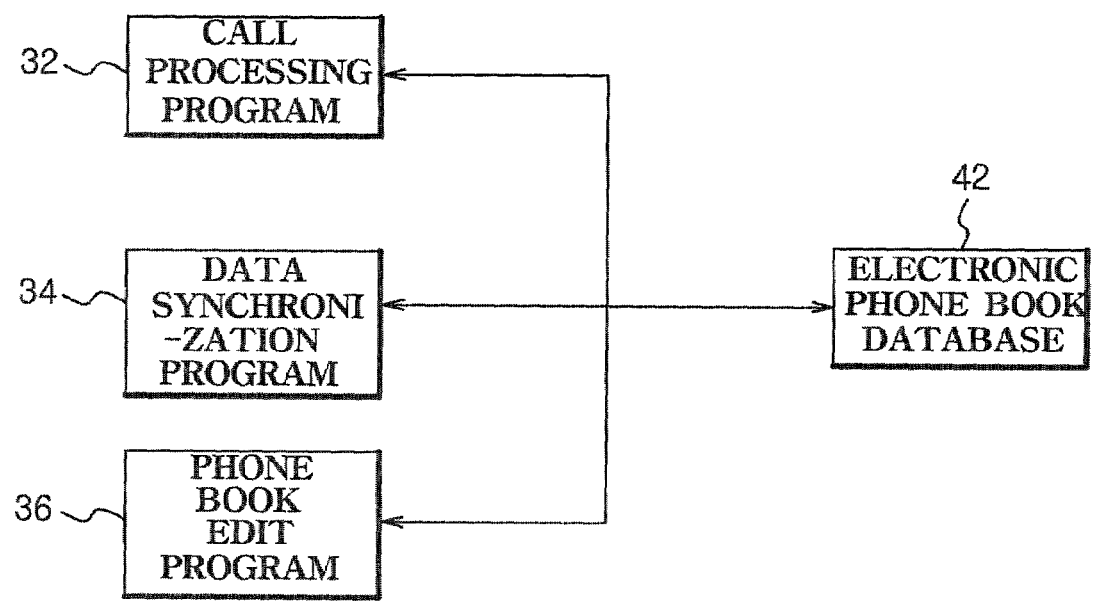
FIG. 2 illustrates an electronic phone book database and programs executed by a controller in the cellular phone.

FIG. 2 illustrates the electronic phone book database 42 and programs executed by the controller 30. Referring to FIG. 2, the controller 30 executes a call processing program 32, a data synchronization program 34 and a phone book editing program 36. Every program in FIG. 2 can access the electronic phone book database 42. These programs, however, are executed independently and cannot simultaneously gain access to the electronic phone book database 42.

The call processing program 32 is executed upon a user's dial/call request or reception of a paging message from a mobile telecommunications system, and controls the radio processor 50 to exchange traffic wirelessly with the mobile communications system. The call processing program 32 further controls the voice processor 60 so that the user can conduct voice communication. The phone book edit program 36 is executed upon the user's menu selection, thereby allowing the user to edit the electronic phone book stored at the electronic phone book database 42 by manipulating the keypad 20. The data synchronization program 34 is executed upon detecting a connection of the cellular phone to an external host computer (not shown), and then processing instructions from the host computer and sending its response back to the host computer, thereby allowing a user of the host computer to edit the electronic phone book stored at the electronic phone book database 42.

In order to edit the electronic phone book from the cellular phone itself, the cellular phone user may manipulate the keypad 20 to enter a phone number and select "store" or "delete" selections from the menu screen on the display 10. Then, the phone book edit program is executed and accesses the electronic phone book database 42.

In another case, when the cellular phone being connected to the external host computer, the data synchronization program 34 is executed. During the data synchronization, the host computer user can edit the electronic phone book through the host computer. Then, the data synchronization program 34 accesses the electronic phone book database 42 to edit the electronic phone book, in response to received instructions from the host computer.

Figure 3:
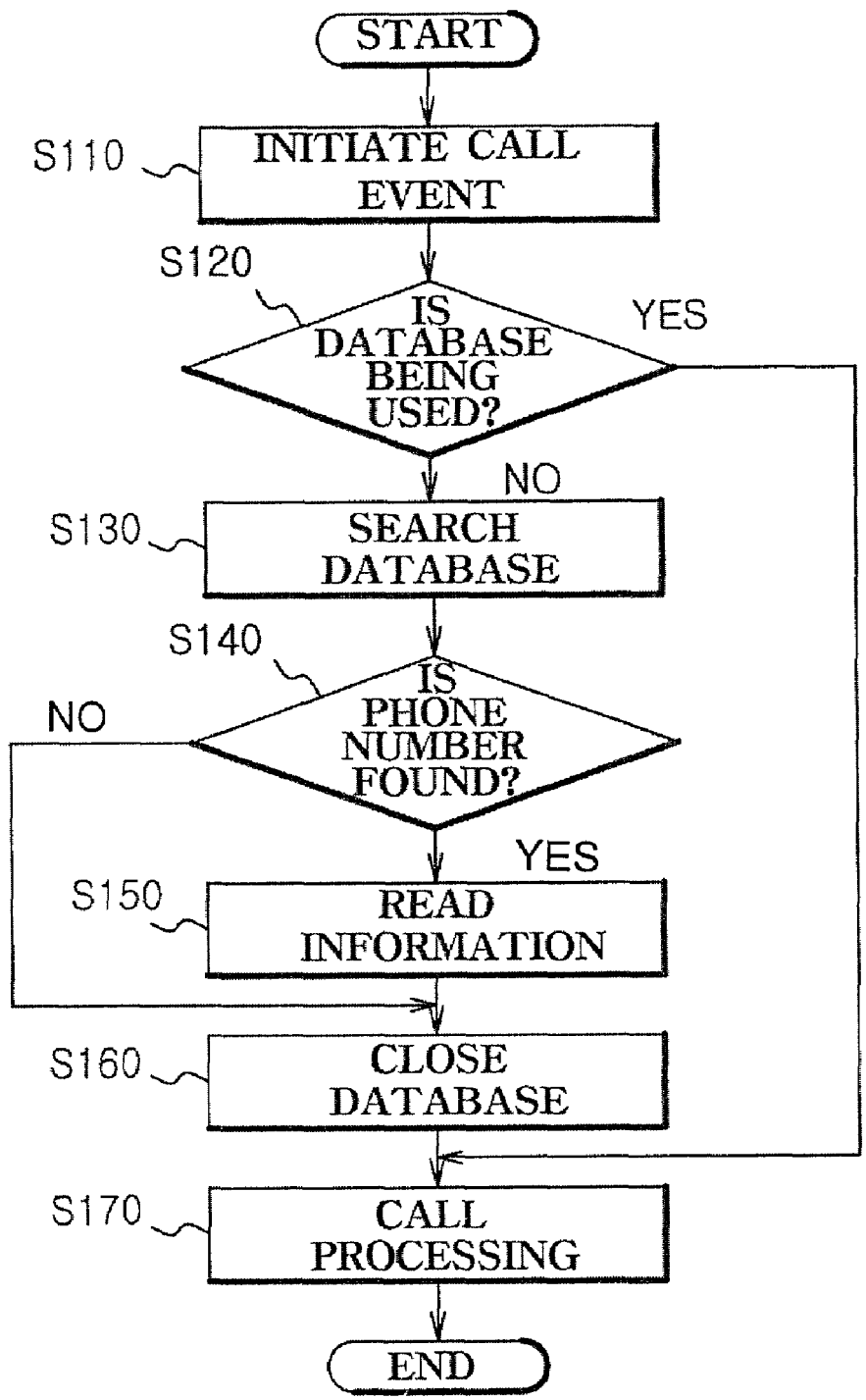
FIG. 3 is a flow chart illustrating the operation of a call service in accordance with a preferred embodiment of the present invention.

A description of a call service in accordance with the present invention will be given herein below with reference to FIGS. 1 to 3. FIG. 3 is a flow chart illustrating the operation of a call service in accordance with a preferred embodiment of the present invention.

Referring to FIG. 3, upon a user dialing a called party's phone number, followed by pressing the call key ("TALK") or receiving a paging message from the mobile telecommunications system via wireless interface, the controller 30 initiates a call event and then executes the call processing program 32 (S110). The executed call processing program 32 determines if the electronic phone book database 42 is being used by another program (the phone book edit program or data synchronization program) (S120).

If it is determined that the electronic phone book database 42 is not being used by any of other programs, the call processing program 32 accesses the electronic phone book database 42 to search for the phone number associated with the call event (S130). The phone number associated with the call event is the called phone number dialed by the user for an outgoing call, or a calling phone number for an incoming call obtained from a paging message, and it is defined as a counterpart's number. If the call processing program 32 finds the counterpart's number after searching the phone book database 42 (S140), then the program 32 reads individual information, particularly a name, associated with the counterpart's number (S150) and then closes the database 42 (S160). If the phone number is not found in the phone book database 42 (S140), then the call processing program 32 closes the database 42 (S160). Thereafter, the call processing program 32 displays the counterpart's phone number and the read name on the display 10 and then advances a call processing (S170).

On the other hand, if it is determined that the electronic phone book database 42 is being used by another program (S120), then the call processing program 32 does not access the database 42. Alternatively, the call processing program displays only the counterpart's phone number on the display 10 and advances the call processing (S170).

Through this procedure, the cellular phone in accordance with the present invention can advance to the call processing while the phone number database 42 is being used by another program.

Figure 4:
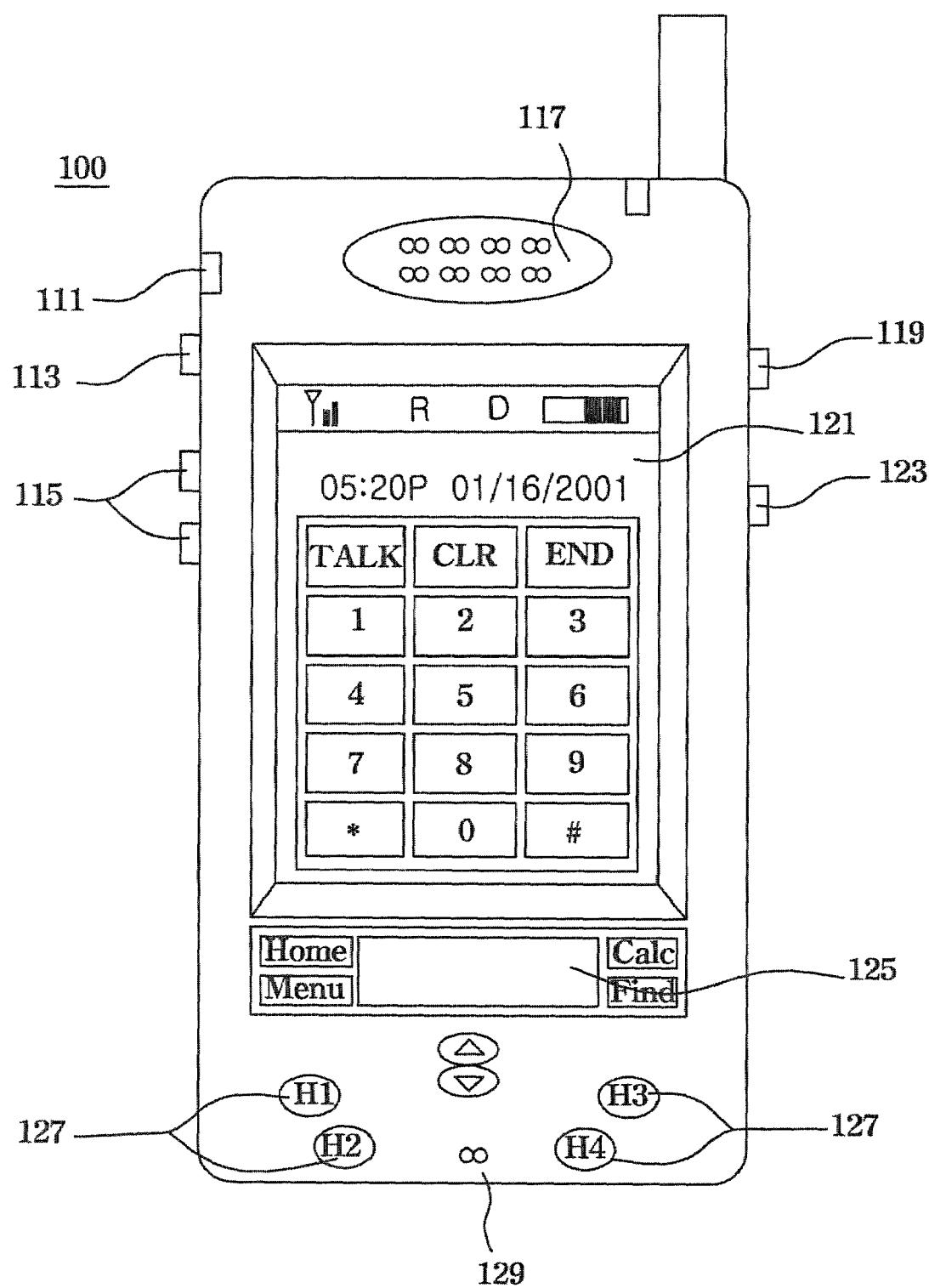
FIG. 4 is a view illustrating an external construction of a conventional personal digital assistant phone.
Figure 5:
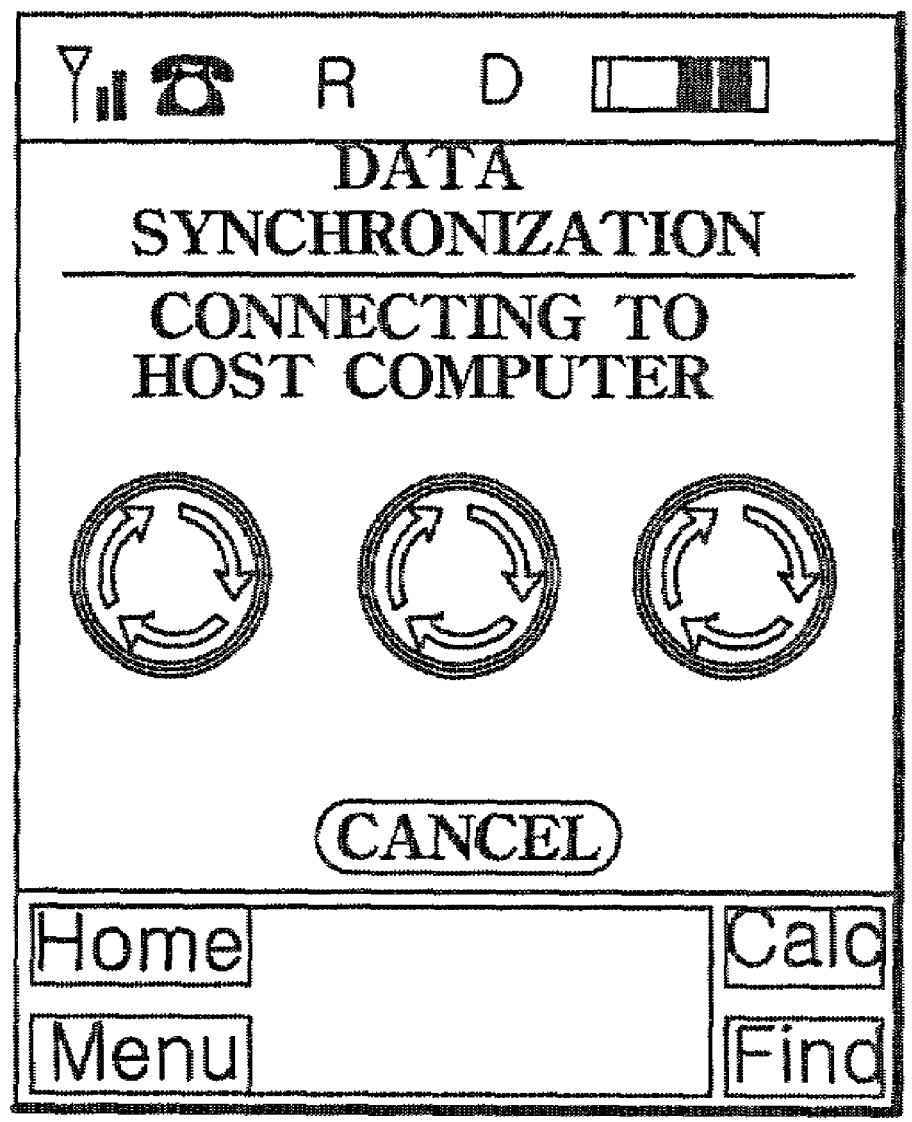
FIG. 5 is a display on a personal digital assistant phone displaying a data synchronization.

A personal digital assistant phone (PDA phone), a cellular phone coupled with a personal digital assistant (PDA), has enhanced computing capability and provides a larger memory capacity in which to store an individual's information database and further provide a data synchronization function. FIG. 4 is a view illustrating an external construction of a conventional personal digital assistant phone. Referring to FIG. 4, the PDA phone 100 comprises a display 121, a speaker 117, a microphone 129, an ear-microphone jack 111, a recording button 113, volume adjuster buttons 115, a contrast button 119, a call button 123, a graffiti screen 125 and function keys 127. The display 121 of PDA phone 100 includes a large size LCD (liquid crystal display) for convenient data communications, which can display a touch pad type keypad screen for input from a user. Programs executed for the PDA phone in FIG. 4 are similar to those programs for the cellular phone as illustrated in FIG. 2. A description of the operation of the PDA phone in accordance with the present invention will be given herein below with reference to FIG. 2.

Upon detecting the connection of the PDA phone 100 in FIG. 4 to a host computer, the controller 30 executes the data synchronization program 34. The data synchronization program 34 accesses the electronic phone book database 42 in response to a received instruction from the host computer. During data synchronization, the display 121 outputs a data synchronization picture with a predetermined logogram and/or phrase indicating it is engaged in the data synchronization. In order to perform a call service application in accordance with the present invention during the data synchronization, the display 121 has to display a call indicating icon on an upper portion of the data synchronization picture, with which the user can use the call service during the data synchronization. The call indicating icon activates, upon clicking it, the keypad screen for the user to use the call service there through.

Figure 6:
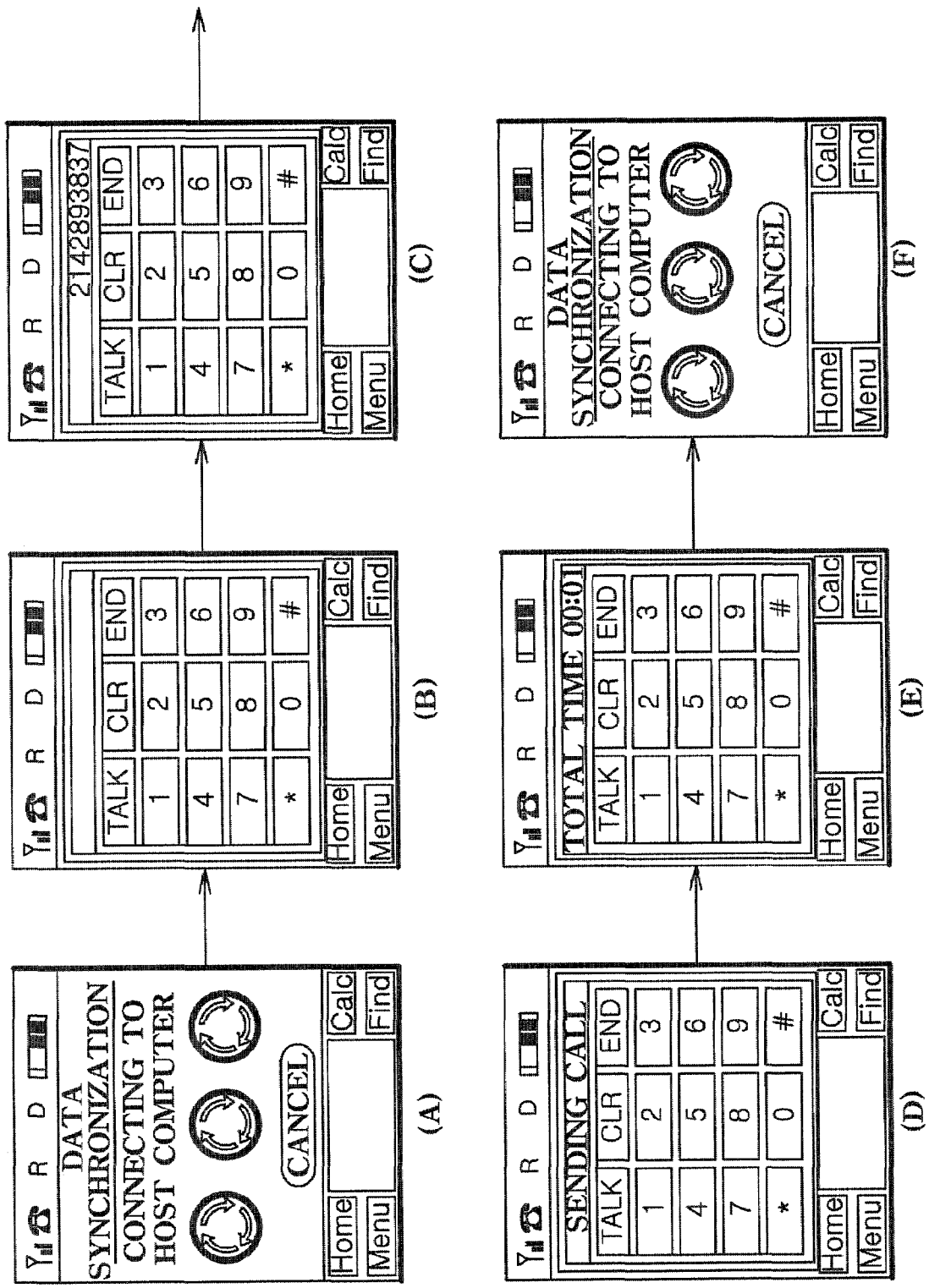
FIGS. 6 and 7 are displays on the personal digital assistant phone displaying procedures of providing call services during data synchronizations.
Figure 7:
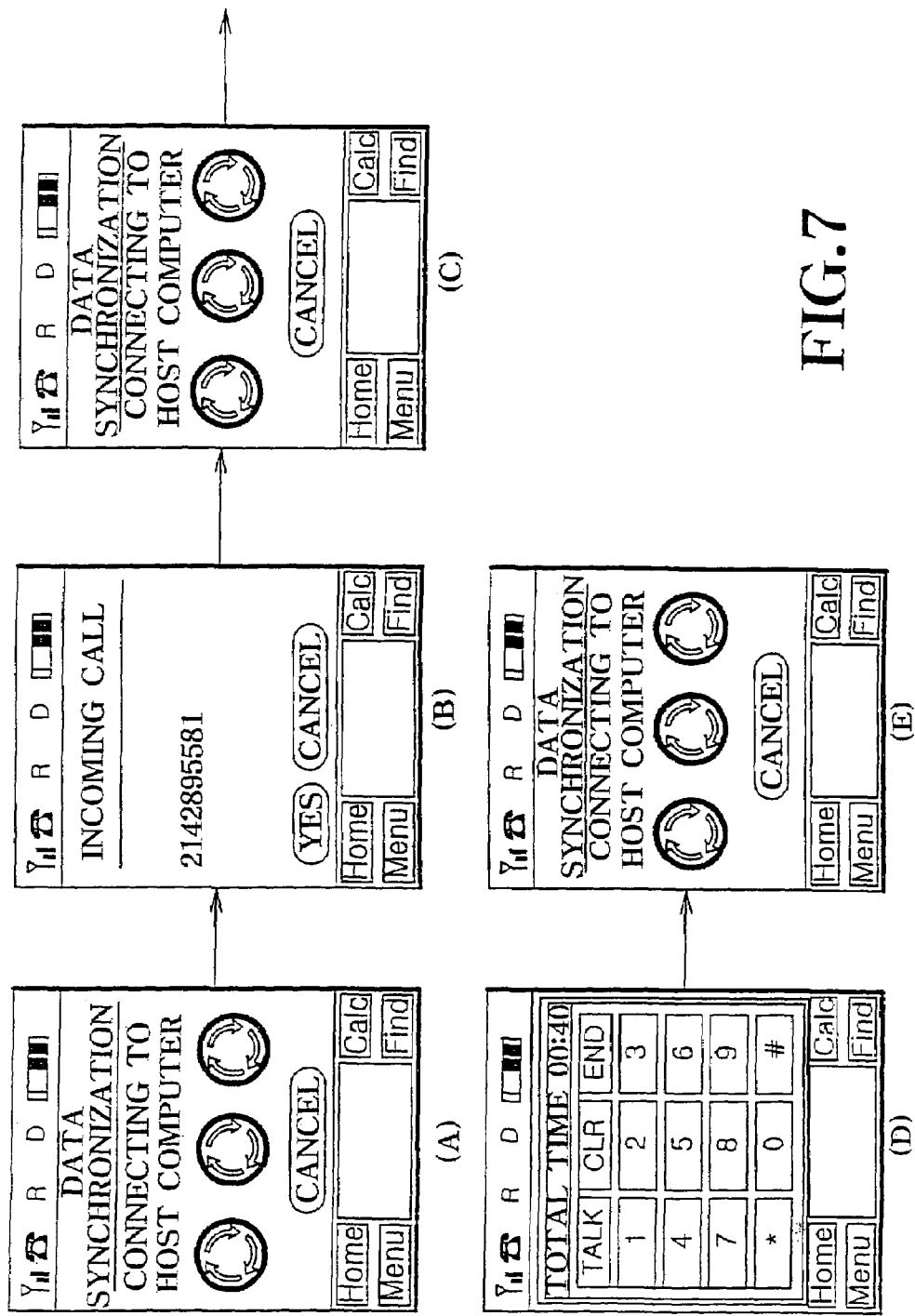

FIGS. 6 and 7 are images on the display 121 of the personal digital assistant phone 100, which display procedures of providing call services during data synchronizations. A description will be given herein below of examples to which the present invention is applied, with reference to FIGS. 6 and 7.

Referring to FIG. 6, a description will be given of an outgoing call procedure during a data synchronization. The picture displayed on the display 121 in FIG. 6(a), is the data synchronization picture with a phrase "connecting to host computer" and a call indicating icon on an upper portion of the picture. Upon detecting the user clicking the call indicating icon, the PDA phone 100 executes the call processing program 32. The call processing program 32 activates the touch pad type keypad screen in FIG. 6(b). The keypad screen in FIG. 6(b) is in the form of a popup window, displayed over the data synchronization picture, while the data synchronization program 34 is still operating. The user may enter a phone number to be called, for example, "2142893837" through the keypad screen as shown in FIG. 6(c).

When the user touches the "TALK" button on the keypad screen, the call processing program 32 exchanges standardized paging messages with the communications system and makes a call. Thereafter, the picture in FIG. 6(d) will be displayed. Before the call initiation, the call processing program 32 determines if the electronic phone book database 42 is being used by another program as shown in FIG. 3 (S120). Since the electronic phone book database 42 is being used by the data synchronization program 34, the call processing program 32 directly advances call processing without searching the database 42 (S170).

When the call processing is advanced and a call path is connected to a called party, the picture in FIG. 6(e) is displayed on the display 121 and the user can conduct a phone conversation with the called party using the speaker 117 and microphone 129. Upon detecting the user's touching an "END" key on the keypad screen, the call processing program 32 terminates the call and the picture in FIG. 6(f) is displayed on the display 121. Referring to the picture in FIG. 6(f), the call processing program 32 is terminated but the data synchronization program 34 continues working.

A description will be given herein below of an incoming call procedure with reference to FIG. 7.

The image displayed on display 121 in FIG. 7(a), is a data synchronization picture with a phrase "connecting to host computer" and a call indicating icon " "on an upper portion of the picture. Upon receiving a paging message a communications system in response to a calling party's call request, the PDA phone 100 executes the call processing program 32. The call processing program 32 determines if the electronic phone book database 42 is being used by another program as illustrated in FIG. 3 (S120). Since the electronic phone book database 42 is being used by the data synchronization program 34, the call processing program 32 directly advances call processing without searching the database 42 (S170). Thus, only the calling party's phone number may be displayed with no name associated with the number as shown in FIG. 7(b). Referring to FIG. 7(b), if the user touches "yes" on the picture, then a call path will be connected to the calling party and then the picture in FIG. 7(c) is displayed on the display 121. Thus, the user can communicate with the calling party using the speaker 117 and the microphone 129.

If the user touches the call indicating icon during the call, then a keypad screen is displayed as shown in FIG. 7(d). Upon detecting the user's touching an "END" key on the keypad screen, the call processing program 32 terminates the call and the picture in FIG. 7(e) will be displayed on the display 121. Referring to FIG. 7(e), the call processing program 32 is terminated but the data synchronization program 34 continues working.

As described hereinabove, the call indicating icon activates the keypad screen in the form of a pop-up window over the data synchronization picture. Therefore, the user can use a variety of additional call services through the keypad screen. These additional call services through the keypad screen can be a transmission of a DTMF tone during a phone call, three party call, call waiting, call transfer and so forth.

As apparent from the above description, the present invention provides a call service method for a cellular phone, which has the following advantages.

According to the present invention, the call service method of the cellular phone can provide the user with an increased convenience of call service usability while editing an electronic phone book database. It can further provide the PDA phone user with important call service functions available with no limitation during the data synchronization.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A call service method for a personal digital assistant phone including a touch pad screen, comprising the steps of:

displaying a data synchronization screen upon detecting a connection of the personal digital assistant phone to a host computer, to thereby perform a data synchronization with the host computer;

determining whether a call service is activated by a user during data synchronization;

displaying a keypad screen on the touch pad screen during data synchronization if it is determined that the call service is activated by the user during data synchronization; and processing the call service through the keypad screen.

2. The method according to claim 1, wherein the data synchronization screen includes a call indication icon, for activating the call service.

3. The method according to claim 1, wherein said keypad screen is displayed as a pop-up window.

4. The method according to claim 1, further including displaying a called party's phone number.

\* \* \* \* \*